US009776314B1

(12) United States Patent
Swinford

(10) Patent No.: US 9,776,314 B1
(45) Date of Patent: Oct. 3, 2017

(54) DUAL IMPACT FLUID DRIVEN HAMMERING TOOL

(71) Applicant: Jason Swinford, Spring, TX (US)

(72) Inventor: Jason Swinford, Spring, TX (US)

( * ) Notice: Subject to any disclaimer, the term of this patent is extended or adjusted under 35 U.S.C. 154(b) by 0 days.

(21) Appl. No.: 15/627,663

(22) Filed: Jun. 20, 2017

(51) Int. Cl.

| | |
|---|---|
| ***B23B 45/16*** | (2006.01) |
| ***B25D 9/00*** | (2006.01) |
| ***B25D 11/00*** | (2006.01) |
| ***B25D 13/00*** | (2006.01) |
| ***B25D 16/00*** | (2006.01) |
| ***B25D 9/18*** | (2006.01) |
| *E21B 6/00* | (2006.01) |
| *E21B 7/04* | (2006.01) |

(52) U.S. Cl.
CPC .......... *B25D 9/18* (2013.01); *B25D 2250/125* (2013.01); *B25D 2250/245* (2013.01); *B25D 2250/275* (2013.01); *E21B 6/00* (2013.01); *E21B 7/04* (2013.01)

(58) Field of Classification Search
CPC ...... B25D 2250/125; B25D 9/18; B25D 9/20; B25D 2250/245; B25D 2250/275; E21B 2034/007; E21B 6/00; E21B 7/04
USPC ................. 173/117–118, 120–122, 124–133, 173/135–138, 184–189, 200–212
See application file for complete search history.

(56) References Cited

U.S. PATENT DOCUMENTS 3,254,524 A 6/1966 Tannenberg
3,280,925 A * 10/1966 Becker .................... E21B 21/12 173/112
3,612,191 A * 10/1971 Martini .................... E21B 4/14 173/136
3,724,560 A * 4/1973 Tibbott ................. B25B 23/145 173/15
3,887,018 A * 6/1975 Jayne ....................... B25D 9/06 173/120
3,892,279 A * 7/1975 Amtsberg ................ B25D 9/12 173/127
4,106,571 A * 8/1978 Stone ........................ E21B 4/14 173/64
4,346,770 A * 8/1982 Beck ..................... E21B 31/113 166/178
4,401,161 A * 8/1983 Warren ................. E21B 31/107 166/178
4,494,615 A * 1/1985 Jones .................... E21B 31/107 173/202
5,267,613 A * 12/1993 Zwart ................... E21B 31/107 166/178
5,273,124 A * 12/1993 Lloyd ....................... E21B 3/02 173/185
5,626,016 A 5/1997 Walter
(Continued)

*Primary Examiner* — Robert Long
(74) *Attorney, Agent, or Firm* — Eric P. Mirabel

(57) ABSTRACT

Disclosed is a fluid hammer tool with two separate fluid hammers in separate sections of the tool. The tool includes an upper poppet valve assembly along one fluid flow path, and a lower poppet valve assembly along a separate outer flow path. Both fluid flow paths are fed from an upper sub and both exit through a lower sub. Both poppet valves include spring return mechanisms. Sealing of each poppet valve propagates an upstream shock wave. The lower poppet valve assembly encounters greater fluid flow and generates a larger shock wave. In the period when the upper poppet valve is closed, the lower poppet valve cannot open.

20 Claims, 5 Drawing Sheets

(56) References Cited

U.S. PATENT DOCUMENTS

| | | | | |
|---|---|---|---|---|
| 6,164,393 | A * | 12/2000 | Bakke | E21B 31/113<br>173/177 |
| 6,315,059 | B1 * | 11/2001 | Geldean | E21B 7/028<br>173/112 |
| 6,655,568 | B2 * | 12/2003 | Thieleke | B25C 1/188<br>173/10 |
| 7,055,542 | B2 * | 6/2006 | Delobel | F16K 1/126<br>137/219 |
| 7,156,190 | B2 * | 1/2007 | Ottestad | B25D 9/12<br>173/128 |
| 9,493,999 | B1 * | 11/2016 | Swinford | E21B 43/38 |
| 2006/0213676 | A1 * | 9/2006 | Jinnings | E02D 7/10<br>173/184 |
| 2009/0301744 | A1 * | 12/2009 | Swinford | E21B 4/14<br>173/200 |
| 2014/0102740 | A1 * | 4/2014 | Jagdale | E02F 3/966<br>173/114 |
| 2015/0013794 | A1 * | 1/2015 | Dirr | E21B 4/14<br>137/596 |

* cited by examiner

DUAL IMPACT FLUID DRIVEN HAMMERING TOOL

BACKGROUND

When the movement of a fluid is suddenly obstructed, e.g., by valve closure, the kinetic energy of the moving fluid causes the fluid to be compressed in the immediate vicinity of the obstruction. The local expansion of the fluid which follows the maximum compression appears as a reversely directed pressure or shock wave that propagates through the fluid. This phenomenon is commonly referred to as a water hammer, even though carrier fluids other than water can be used to generate the same effect.

In oil and gas well drilling, it is common to use a down hole motor which is driven by a flow of incompressible fluid (preferably high specific gravity fluid drilling mud) which rotates an attached drill bit. The mud can also act to clear cuttings from the hole and provide down hole pressure control (and thereby inhibit blow outs).

However, particularly when drilling in rock and hard materials and when directional (i.e. non-vertical) drilling, there may be insufficient down hole weight on the drill bit to fracture rock and achieve an economically feasible rate of progress. A fluid hammer drill may be used to increase the rate of progress. Water is preferred for the fluid hammer because mud, with its high viscosity, tends to rapidly wear the internal surfaces of the hammer.

It may be preferred to have mud driving the drill bit rotation, and to also have a flow of water or other less dense fluid to drive the fluid hammer. A fluid hammer with impacts in more than one section, and where the impacts can form additive shock waves, is more preferred—including where drilling is done with coil tubing.

SUMMARY

A fluid hammer tool with two separate fluid hammers in separate sections of the tool is described. The tool includes an upper sub with a fluid inlet end and a longitudinal bore, and passages connecting the longitudinal bore to an outer bore, where the outer bore is defined by the interior of an outer barrel which connects the upper sub with a lower sub. A diffuser is downstream of the upper sub and has a main bore communicating with the longitudinal bore of the upper sub. The diffuser further includes exit passages having a smaller diameter than the main bore in fluid communication with the main bore. The exit passages feed a first chamber housing an upper poppet valve assembly.

The upper poppet valve assembly has a valve stem which can move downstream to seal a longitudinal bore of a lower poppet valve assembly, by contacting an upstream edge of a lower poppet valve assembly, and thereby prevent fluid flow from the first chamber into the longitudinal bore of the lower poppet valve assembly. Closing of the upper poppet valve generates a first fluid hammering impact, which is immediately followed by opening of the upper poppet valve assembly due to the lower pressure in the expansion zone which is generated, cavitation generated by the diffuser and the action of a first spring return mechanism.

The longitudinal bore of the lower poppet valve assembly is in fluid communication with a longitudinal bore of the lower sub—from which fluid exits the tool. The greatest outer diameter of all portions of the lower poppet valve assembly is less than the inner diameter of the outer barrel, such that there is a restricted flow path between the outer barrel and the lower poppet valve assembly. The lower poppet valve assembly can move downstream against a second spring return mechanism within the outer barrel to seal against the upstream edge of the lower sub, whereby a second fluid hammering impact is generated, immediately followed by opening of the lower poppet valve assembly due to the lower pressure in the expansion zone which is generated, cavitation generated by a restricted portion of the flow path between the lower poppet valve assembly and the inner surface of the outer barrel, and the action of the second spring return mechanism.

Where the first and second fluid hammering impacts are simultaneous (or nearly simultaneous, as there is a spatial separation between where they are generated which the second shock wave must travel through to add with the first), the shock waves will be additive and have increased energy.

It should be understood that the drawings and the associated description below are intended and provided to illustrate one or more embodiments of the present invention, and not to limit the scope of the invention. Also, it should be noted that the drawings are not be necessarily drawn to scale.

DETAILED DESCRIPTION

Figure 1:
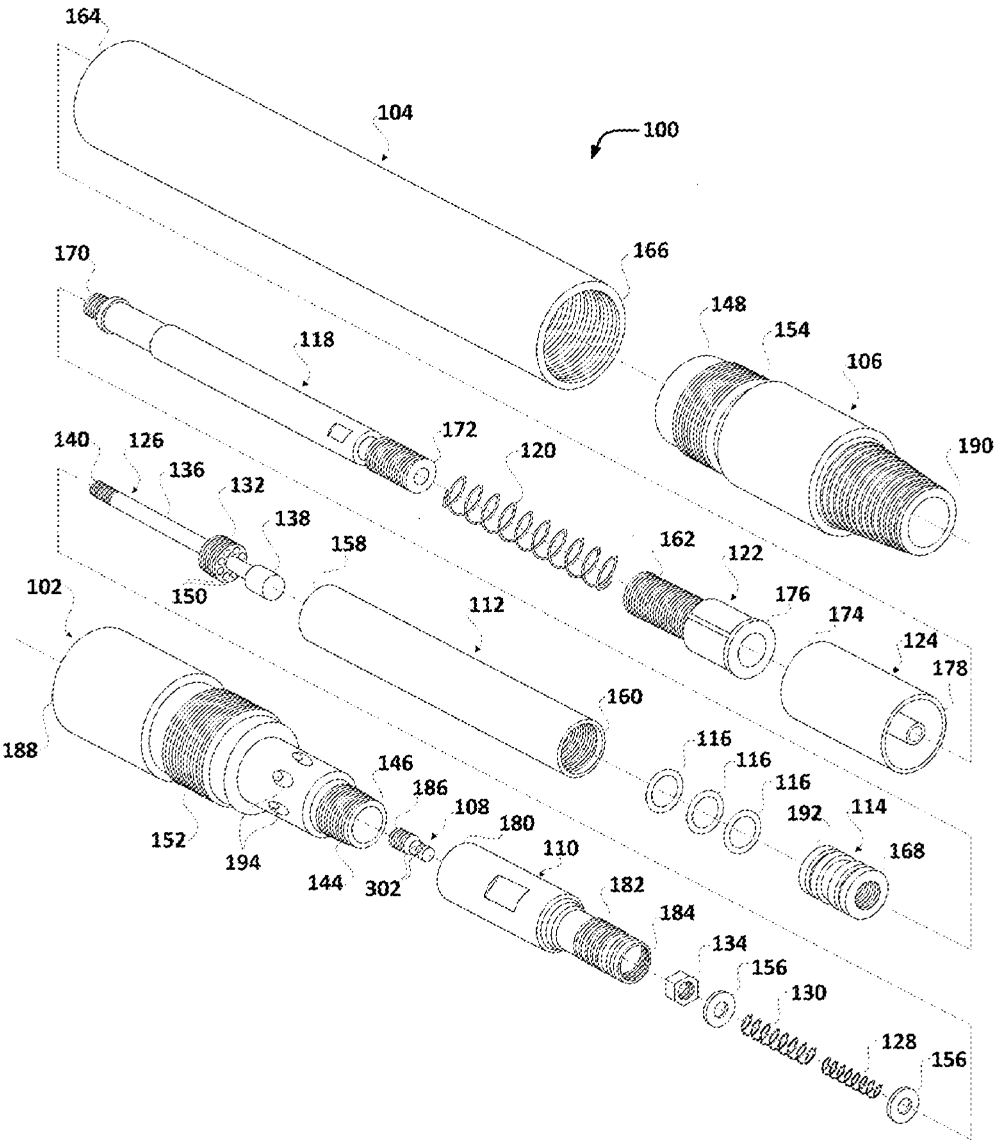
FIG. 1 is an exploded view of a first embodiment of a dual impact fluid driven hammering tool provided by the present invention.

A first embodiment of a dual impact fluid driven hammering tool of the invention is shown in FIGS. 1, 2A, 2B and 2C. As illustrated in FIG. 1, the dual impact fluid driven hammering tool 100 comprises an upper sub 102, an outer barrel 104, a lower sub 106, a diffuser 108, an upper valve body 110, and an inner valve barrel 112. In an assembled and operating dual impact fluid driven hammering tool 100, pressurized fluid enters through upper sub 102 and exits through lower sub 106. The term "upstream," as used herein, denotes the direction opposite to flow of pressurized fluid i.e. from the lower sub 106 towards the upper sub 102; and the term "downstream" indicates fluid flow in the opposite direction—with the flow of pressurized fluid.

A lower poppet valve assembly within the dual impact fluid driven hammering tool 100 includes an upper piston 114, a set of O-rings 116 which seal upper piston 114 against the interior of inner valve barrel 112, a pilot shaft 118, a compression spring 120, an inner lower sub 122, and a lower valve head 124. Upper valve body 110 houses an upper poppet valve assembly, which includes upper poppet valve (valve stem) 126, an inner spring 128, an outer spring 130, a valve frame 132, a locking nut 134, and washers 156. In comparison with outer spring 130, inner spring 128 is preferably shorter, has a smaller diameter (measured across the helical dimension), and offers higher resistance to compression. Thus, material of inner spring 128 may preferably have a greater gauge and/or resistance than that of outer spring 130.

Upper poppet valve 126 is formed from a cylindrical portion 136 and a valve stub 138. At the opposite end of cylindrical portion 136 from valve stub 138, end 140 is externally threaded for being screwed with locking nut 134.

An externally threaded end 186 of diffuser 108 is screwed into a threaded interior slot 142 (illustrated in FIGS. 2A-2C) of upper valve body 110, which lies within the bore of outer barrel 104. An internally threaded end 180 of upper valve body 110 is screwed together with externally threaded region 144 of upper sub 102 (lying near end 146 of upper sub 102). An externally threaded portion 182 proximal to end 184 of upper valve body 110 is screwed with internally threaded end 158 of inner valve barrel 112. The valve frame 132 is screwed with an internally threaded portion of end 184 of upper valve body 110. The other internally threaded end of 160 inner valve barrel 112 is screwed together with an externally threaded cylindrical portion 162 of the inner lower sub 122. Upper sub 102 and lower sub 106 are screwed to opposite ends of outer barrel 104. While threaded region 152 of the upper sub 102 is screwed with internally threaded end 164 of outer barrel 104, the other internally threaded end 166 of the outer barrel 104 is screwed with externally threaded region 154 of the lower sub 106.

Figure 2A:
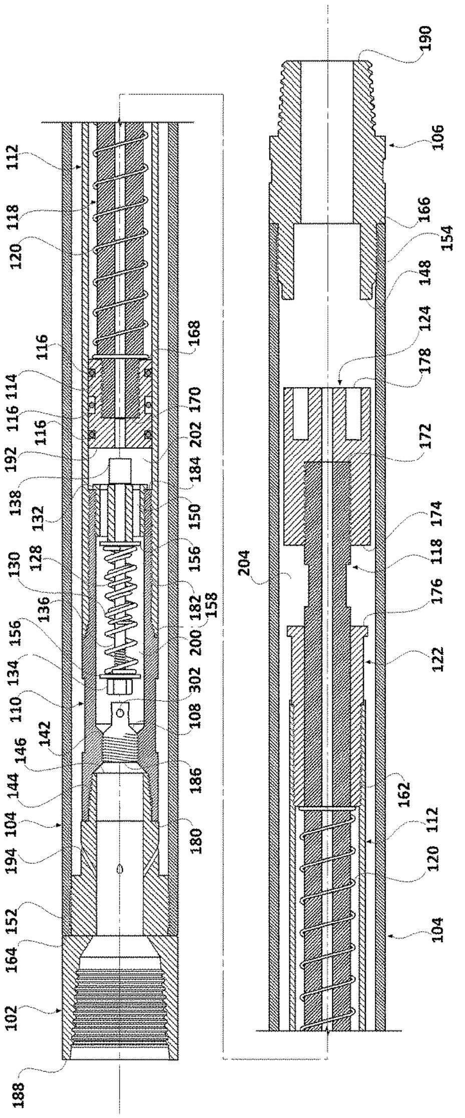
FIGS. 2A, 2B and 2C are cross-sectional views of the first embodiment (as assembled) taken along its axis during various stages of its operation, but with the diffuser, nut, and all springs shown in perspective and not sectional view.
Figure 2B:
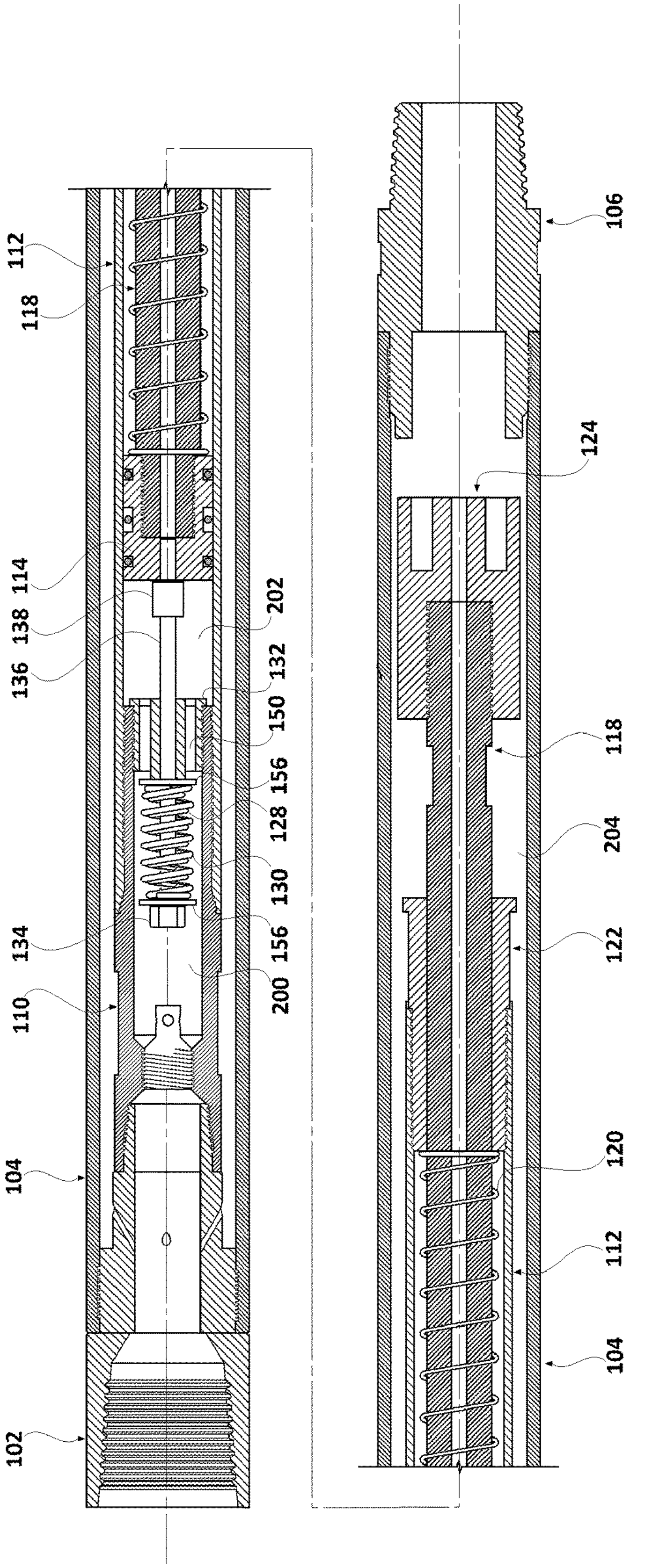
Figure 2C:
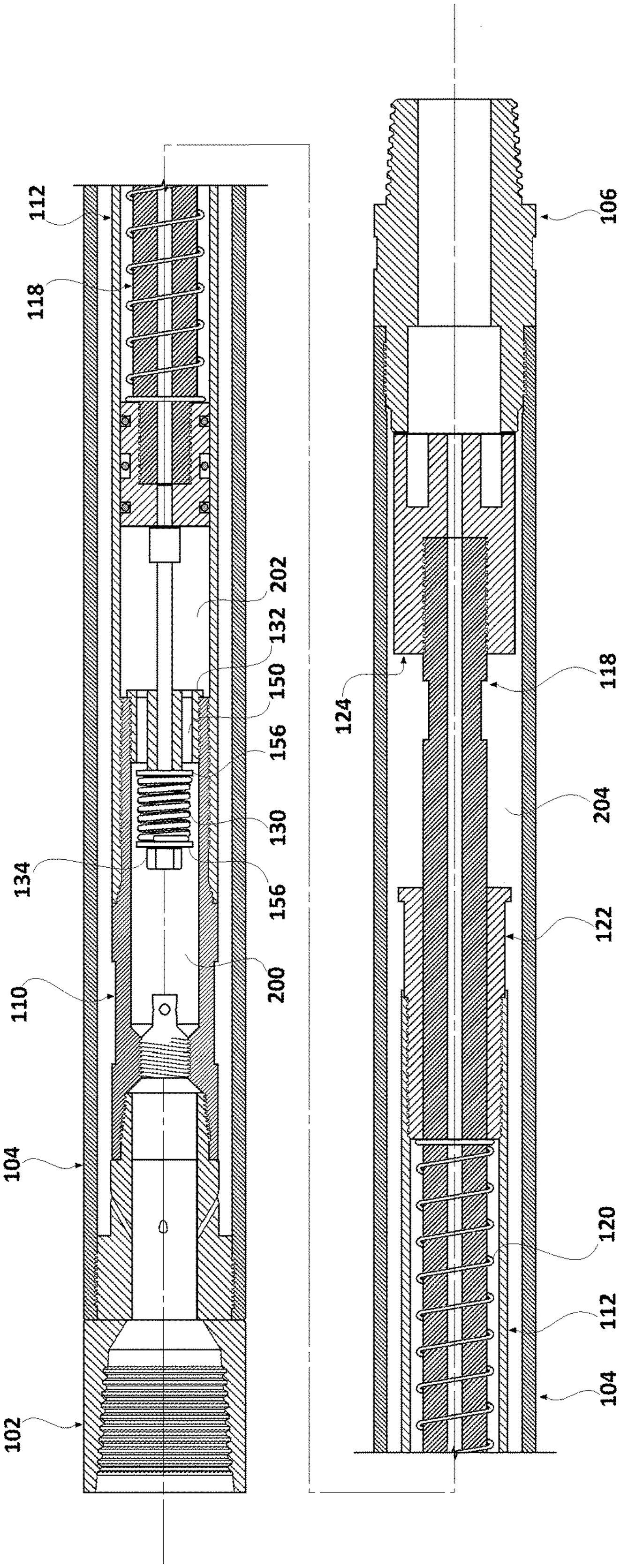

Valve stub 138 and externally threaded end 140 lie on opposite sides of valve frame 132 with externally threaded end 140 proximal to upper sub 102. Within upper valve body 110, cylindrical portion 136 can slide within a central passage of valve frame 132. Inner spring 128 and outer spring 130 surround cylindrical portion 136 and their assembly is locked between valve frame 132 and locking nut 134, through washers 156 (as illustrated in FIGS. 2A-2C). The locking nut 134 is screwed with externally threaded end 140. In the upper valve body 110, downstream movement of upper poppet valve 126 (i.e. in a direction away from upper sub 102) initially requires overcoming compression resistance from outer spring 130 (which is longer than inner spring 128), and when the outer spring 130 is compressed to reduce its length below that of the uncompressed inner spring 128, the compression resistance of both outer spring 130 and the inner spring 128 has to be overcome to continue to move upper poppet valve 126 in such direction.

The upper piston 114 is secured within inner valve barrel 112 by screwing its internally threaded end 168 with externally threaded end 170 of the pilot shaft 118, which extends through the assembly of inner valve barrel 112 and inner lower sub 122. Compression spring 120 surrounds the portion of pilot shaft 118 lying between upper piston 114 and inner lower sub 122. Over the pilot shaft 118, the ends of compression spring 120 are bounded by the upper piston 114 and inner lower sub 122. The externally threaded distal end 172 of pilot shaft 118 lies exterior to inner lower sub 122 and is screwed with internally threaded end 174 of lower valve head 124. The upper piston 114 along with the portion of pilot shaft 118 lying between upper piston 114 and inner lower sub 122 (which is also surrounded by the compression spring 120), slides within the internal cavity of inner valve barrel 112 and inner lower sub 122. To provide a sealed interface between upper piston 114 and the internal surface of inner valve barrel 112 when the former slides through the latter, three O-rings 116 are provided on a grooved surface of upper piston 114. Within inner valve barrel 112, longitudinal displacement of upper piston 114 is restricted at one end by valve stub 138 of upper poppet valve 126 and at the other end, by end 162 of inner lower sub 122. Similarly, longitudinal displacement of lower valve head 124 within outer barrel 104 is restricted between end 176 of inner lower sub 122 and end (or the upstream edge) 148 of the lower sub 106.

When positioned as in FIG. 2A, the assembly of upper piston 114, pilot shaft 118 and lower valve head 124 can freely slide downstream, but movement towards lower sub 106 can be made only by overcoming compression resistance of compression spring 120. When springs 128 and 130 are compressed (either partially or fully) such that upper poppet valve 126 is closed (valve stub 138 is in contact with the upper piston 114 at its upper surface 192, sealing the bore along upper piston 114 etc., as illustrated in FIGS. 2B and 2C), the assembly of upper piston 114, pilot shaft 118 and lower valve head 124 cannot freely move upstream towards valve frame 132. However, closure of upper poppet valve 126 (and lower valve head 124), when the tool is operating, is momentary (see below).

The force to propel downstream movement of the assembly of upper piston 114, pilot shaft 118 and lower valve head 124 is from pressure resulting from liquid entering upper sub 102, which is then forced out of ports 194 and into chamber 204, where the pressure on the uppermost surface 174 of lower valve head 124 forces the entire assembly downstream. The pressure downstream of lower valve head 124 is relatively lower than on its upstream side because fluid must flow through the relatively narrow passage between the outer surface of valve head 124 and the inner surface of outer barrel 104, generating a reduced pressure zone downstream of valve head 124 and upstream of lower sub 106.

Compression of compression spring 120 is at a maximum when end 178 of the lower valve head 124 closes and seals against end 148 of lower sub 106 (as illustrated in FIG. 2C), propagating a shock wave in the upstream direction. A low pressure zone following the shock wave, coupled with the force provided by decompression of spring 120, moves lower valve head 124 (and its end 178) away from end 148 of the lower sub 106 (breaking the seal and allowing fluid to exit through lower sub 106), after which the cycle can repeat. As noted, the lower poppet valve assembly (including upper piston 114, pilot shaft 118 and lower valve head 124) cannot move upstream if upper poppet valve 126 is closed, due to the pressure in chamber 202. The fact that the outer diameter of lower valve head 124 is smaller than inner diameter of the outer barrel 104 generates cavitation (i.e., zones of wide pressure variation) due to a venturi effect during sliding of the lower valve head 124 within the outer barrel 104.

In operation of dual impact fluid driven hammering tool 100 (which can take place sub-surface and preferably in conjunction with coiled tubing drilling operations), pressurized fluid enters through upper sub 102 and exits through lower sub 106. Each of upper sub 102, outer barrel 104, inner valve barrel 112, upper piston 114, pilot shaft 118, lower valve head 124, and lower sub 106 include a longitudinal bore to permit fluid flow. The upper valve body 110 and inner lower sub 122 also include a longitudinal bore. Cylindrical portion 136 of upper poppet valve 126 resides in the longitudinal bore of valve frame 132, and pilot shaft 118 extends through the longitudinal bore of inner lower sub 122. While the interfaces of the longitudinal bores of valve frame 132 with cylindrical portion 136 and of inner lower sub 122 with pilot shaft 118 are sealed, pressurized fluid can flow from first chamber 200 into second chamber 202 through a set of passages 150 in valve frame 132. The passages 150 in valve frame 132 are preferably distributed symmetrically around its axis. From second chamber 204 (unless valve stem 138 is sealed against upper surface 192) pressurized fluid get delivered into the longitudinal bore of lower valve head 124 by travelling through the continuous bore through upper piston 114 and pilot shaft 118.

Figure 3:
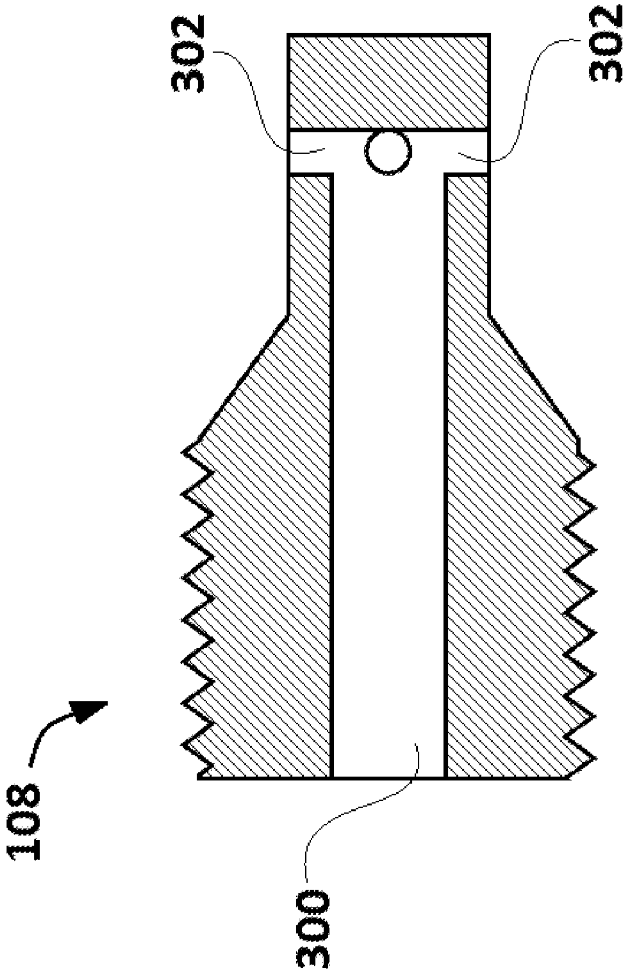
FIG. 3 illustrates a cross-sectional view of the diffuser used in the first embodiment.

Fluid enters first chamber 200 through diffuser 108, and more specifically, after fluid enters into diffuser 108's longitudinal bore 300 which connects with four narrowed passages 302 (illustrated in FIG. 3)—causing cavitation within first chamber 200, due to the venturi effect. The pressure is higher in first chamber 200 than in chamber 202 (which is fed through passages 150) which forces upper poppet valve 126 downstream and causes valve stub 138 to momentarily seal against upper piston 114, generating a shock wave upstream. Thereafter, the following low pressure zone and the force from springs 128 and 130 force upper poppet valve 126 and valve stub 138 upstream—breaking the seal and thereby draining the fluid from second chamber 202 into the bore of upper piston 114, and plunging the pressure within second chamber 202 and first chamber 200. The continuous fluid flow into upper sub 102 then causes the cycle to repeat.

The dimension of longitudinal bore within each component may vary to provision a desired type of flow path within the component and/or to facilitate its alignment with other components. For example, the outer diameter of portion of pilot shaft 118 which slides through the inner lower sub 122 matches the diameter of the longitudinal bore of the inner lower sub 122. Similarly, the diameter of outer surface of the upper piston 114 matches with the diameter of inner surface of the inner valve barrel 112 (and that surface is sealed with O-rings 116).

Within outer barrel 104, the portion of the upper sub 102 covered by outer barrel 104 but exterior to upper valve body 110 includes multiple fluid flow passages 194 branching from the longitudinal bore of the upper sub 102. Passages 194 feed chamber 204 formed between outer barrel 104 and the outer surface of upper valve body 110 and the connected portions including inner valve barrel 112. Thus, fluid entering upper sub 102 follows one of two different fluid flow paths.

The first fluid flow path is formed along the longitudinal bores of upper sub 102, diffuser 108, upper valve body 110, inner valve barrel 112, passages 150, upper piston 114, pilot shaft 118, inner lower sub 122, lower valve head 124 and lower sub 106. The second fluid flow path is formed by passages 194, which permit flow into the chamber 204, and then into lower sub 106. Both flow paths merge into the longitudinal bore of lower sub 106. In operation of fluid driven hammering tool 100, a larger volume of fluid entering the upper sub 102 flows through the second fluid flow path. Since sealing of lower valve head 124 and end 148 of the lower sub 106 halts flow of a larger volume of fluid than does sealing of valve stub 138 of upper poppet valve 126, it generates a larger pressure on sealing, and a larger hammering impact than does sealing of valve stub 138 of upper poppet valve 126.

The fluid driven hammering tool 100 is connected in a coiled tubing set-up through upper sub 102 and lower sub 106. Water or other fluid enters it through the end 188 of the upper sub 106, and exits through end 190 of the lower sub 106.

The hammering impacts generated by the sealing of lower valve head 124 and upper poppet valve 126 can take place at different intervals. But when impacts are simultaneously produced by both, or near simultaneously, a resonant or amplified impact having a larger amplitude shock wave and greater energy may be produced. As such, increasing the frequencies of hammering impacts generated by making and breaking of seals formed by lower valve head 124 and the upper poppet valve 126 will generally result in a greater frequency of simultaneous impacts and greater frequency of higher energy shock waves. Impact frequencies can be adjusted, especially increased, by increasing the fluid flow through adjusting the internal dimensions of passages 194, 300 or 302, or the gap between the outer diameter of lower valve head 124 and the inner diameter of the outer barrel 104. The fact that the lower poppet valve assembly (including upper piston 114, pilot shaft 118 and lower valve head 124) cannot move upstream when upper poppet valve 126 is sealed (as shown in FIGS. 2B and 2C), may assist in bringing both these poppet valves into simultaneous closure (resulting in a greater frequency of higher energy shock waves) more often than would otherwise take place.

The foregoing description and embodiments are intended to merely illustrate and not limit the scope of the invention. Other embodiments, modifications, variations and equivalents of the invention will be apparent to those skilled in the art and are also within the scope of the invention, which is only described and limited in the claims which follow, and not elsewhere.

What is claimed is:

1. A fluid driven hammering tool comprising an upper sub with a fluid inlet end and a longitudinal bore, and passages connecting the central bore to an outer bore, where the outer bore is defined by the interior of an outer barrel which connects the upper sub with a lower sub;

a diffuser downstream of the upper sub and having a main bore communicating with a longitudinal bore of the upper sub and with exit passages having a smaller diameter than the main bore, said exit passages being in fluid communication with the main bore, where the exit passages feed a chamber housing an upper poppet valve assembly;

the upper poppet valve assembly is downstream of the diffuser and includes a first spring return mechanism, wherein a valve stem of said upper poppet valve assembly can move downstream to seal a longitudinal bore of a lower poppet valve assembly, and thereby prevent fluid flow from the chamber into the longitudinal bore of said lower poppet valve assembly, prior to return by the first spring return mechanism; and wherein, the longitudinal bore of said lower poppet valve assembly is in fluid communication with a longitudinal bore of the lower sub, from which fluid exits the tool; and wherein, said lower poppet valve assembly moves against a second spring return mechanism, and said lower poppet valve assembly can move downstream within the outer barrel to seal against the upstream edge of the lower sub whereupon the second spring return mechanism acts to return said lower poppet valve assembly back upstream; and wherein the greatest outer diameter of all portions of said lower poppet valve assembly is less than the inner diameter of the outer barrel.

2. The tool of claim 1 wherein the first spring return mechanism includes a longer outer spring and a shorter inner spring around the valve stem.

3. The tool of claim 1 wherein the upper poppet valve assembly includes a valve frame around a pilot shaft, wherein the valve frame contacts the inner wall of the chamber and has passages through it which allow fluid flow into the longitudinal bore of said lower poppet valve assembly.

4. The tool of claim 3 wherein downstream travel of the springs in the first spring return mechanism is prevented by said valve frame.

5. The tool of claim 3 wherein the passages restrict flow through the valve frame such that a greater pressure upstream than downstream of it is generated.

6. The tool of claim 1 wherein said lower poppet valve assembly includes an upper piston snugly fitting into an inner valve barrel which is contiguous with said chamber, said fitting being sealed with O-rings around the upper piston.

7. The tool of claim 6 wherein said lower poppet valve assembly includes a pilot shaft connected with the upper piston both of which have an aligned longitudinal bore, and a compression spring in the second spring return mechanism surrounds the shaft.

8. The tool of claim 7 wherein said pilot shaft is connected to a lower valve head, which has a larger exterior diameter than any other portion of the lower poppet valve assembly, and which seals against the upstream edge of the lower sub.

9. The tool of claim 7 wherein said pilot shaft slides within an inner lower sub affixed to the lower end of the inner valve barrel and wherein downward travel of the compression spring in the second spring return mechanism is prevented by contact with said inner lower sub.

10. A fluid driven hammering tool generating two fluid hammers, comprising an upper sub with a fluid inlet end and a longitudinal bore, and passages connecting the longitudinal bore to an outer bore, where the outer bore is defined by the interior of an outer barrel which connects the upper sub with a lower sub;

a diffuser downstream of the upper sub and having a main bore communicating with longitudinal bore of the upper sub and with exit passages having a smaller diameter than the main bore in fluid communication with the main bore, where the exit passages feed a chamber housing an upper poppet valve assembly;

the upper poppet valve assembly is downstream of the diffuser and is includes a first spring return mechanism, wherein a valve stem of said upper poppet valve assembly can move downstream to cause compression of the first spring return mechanism and also to seal a longitudinal bore of a lower poppet valve assembly, by contacting an upstream edge of the lower poppet valve assembly, and thereby prevent fluid flow from the chamber into the longitudinal bore of said lower poppet valve assembly whereby a first fluid hammering impact is generated, immediately followed by opening of the upper poppet valve assembly and decompression of the first spring return mechanism; and wherein, the longitudinal bore of said lower poppet valve assembly is in fluid communication with a longitudinal bore of the lower sub, from which fluid exits the tool; and wherein, the greatest outer diameter of all portions of said lower poppet valve assembly is less than the inner diameter of the outer barrel; and wherein, said lower poppet valve assembly moves downstream within the outer barrel to cause compression of a second spring return mechanism and also to to seal against the upstream edge of the lower sub whereby a second fluid hammering impact is generated, immediately followed by opening of the lower poppet valve assembly and decompression of the second spring return mechanism.

11. The tool of claim 10 wherein the exit passages of the diffuser are fewer in number and/or smaller in diameter than the passages in the upper sub, whereby the second hammering impact is larger than the first hammering impact.

12. The tool of claim 10 wherein the upper poppet valve assembly includes a valve frame around a pilot shaft, wherein the valve frame contacts the inner wall of the first chamber and has passages through it which allow fluid flow into the center bore of said lower poppet valve assembly.

13. The tool of claim 12 wherein downstream travel of springs in the first spring return mechanism is prevented by said valve frame.

14. The tool of claim 12 wherein the passages restrict flow through the valve frame such that a greater pressure upstream than downstream of it is generated.

15. The tool of claim 10 wherein the first spring return mechanism includes a longer outer spring and a shorter inner spring around the valve stem.

16. The tool of claim 15 wherein the longer outer spring offers less compression resistance than the shorter inner spring.

17. The tool of claim 10 wherein said lower poppet valve assembly includes an upper piston snugly fitting into an inner valve barrel which is contiguous with said chamber, said fitting being sealed with O-rings around the upper piston.

18. The tool of claim 17 wherein said lower poppet valve assembly includes a pilot shaft connected with the upper piston both of which have an aligned longitudinal bore, and a compression spring in the second spring return mechanism surrounds the pilot shaft.

19. The tool of claim 18 wherein said pilot shaft is connected to a lower valve head, which has a larger exterior diameter than any other portion of the lower poppet valve assembly, and which seals against the upstream edge of the lower sub.

20. The tool of claim 19 wherein said pilot shaft slides within an inner lower sub affixed to the lower end of the inner valve barrel and wherein downward travel of the compression spring in the second spring return mechanism is prevented by contact with said inner lower sub.

* * * * *